United States Patent
Aida (10) Patent No.: US 9,166,726 B2
(45) Date of Patent: Oct. 20, 2015

(54) DIVERGING DEVICE WITH OADM FUNCTION AND WAVELENGTH DIVISION MULTIPLEXING OPTICAL NETWORK SYSTEM AND METHOD THEREFOR

(75) Inventor: Ryuji Aida, Tokyo (JP)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 14/112,020

(22) PCT Filed: Apr. 20, 2012

(86) PCT No.: PCT/JP2012/060674
§ 371 (c)(1),
(2), (4) Date: Oct. 15, 2013

(87) PCT Pub. No.: WO2012/144585
PCT Pub. Date: Oct. 26, 2012

(65) Prior Publication Data
US 2014/0037284 A1    Feb. 6, 2014

(30) Foreign Application Priority Data

Apr. 20, 2011    (JP) ................................ 2011-094126

(51) Int. Cl.
*H04B 10/00* (2013.01)
*H04J 14/02* (2006.01)
(52) U.S. Cl.
CPC ......... *H04J 14/0227* (2013.01); *H04J 14/0201* (2013.01); *H04J 14/0204* (2013.01); *H04J 14/0205* (2013.01); *H04J 14/0221* (2013.01)
(58) Field of Classification Search
CPC ........................... H04B 10/296; H04J 14/0221

USPC ................................................. 398/45–64, 83
See application file for complete search history.

(56) References Cited

U.S. PATENT DOCUMENTS

| | | | |
|---|---|---|---|
| 6,233,078 B1 * | 5/2001 | Harano et al. ................... | 398/14 |
| 6,522,803 B1 * | 2/2003 | Nakajima et al. ............... | 385/24 |
| 8,351,790 B2 | 1/2013 | Midorikawa et al. | |
| 2004/0131353 A1 | 7/2004 | Cannon et al. | |

(Continued)

FOREIGN PATENT DOCUMENTS

| EP | 1 058 475 A2 | 12/2000 |
|---|---|---|
| EP | 1 501 225 A2 | 1/2005 |

(Continued)

OTHER PUBLICATIONS

Extended European Search Report dated Oct. 16, 2014.

(Continued)

*Primary Examiner* — Daniel Dobson
(74) *Attorney, Agent, or Firm* — McGinn IP Law Group, PLLC (57) ABSTRACT

The present invention does not require control and path switching by terminal station equipment and prevents the deterioration of signal quality when a cable failure occurs. A wavelength diverging device connected with three or more stations monitors an uplink signal received from each station, and when detecting the absence of an uplink signal received from any station, outputs dummy light instead of the absent signal, performs multiplexing/de-multiplexing for the dummy light and an uplink signal received from a station excluding said any station, and outputs the multiplexed/de-multiplexed signal. All of said processes are performed within the wavelength diverging device.

17 Claims, 7 Drawing Sheets

(56) References Cited

U.S. PATENT DOCUMENTS

| | | |
|---|---|---|
| 2011/0076017 A1 | 3/2011 | Midorikawa et al. |
| 2011/0311216 A1 | 12/2011 | Inoue |

FOREIGN PATENT DOCUMENTS

| | | |
|---|---|---|
| JP | 10-173598 A | 6/1998 |
| JP | 2002-044023 A | 2/2002 |
| JP | 2003-174412 A | 6/2003 |
| JP | 2006-033412 A | 2/2006 |
| JP | 2006-066946 A | 3/2006 |
| JP | 2006-080777 A | 3/2006 |
| JP | 2007-174412 A | 7/2007 |
| JP | 2007-526702 A | 9/2007 |
| JP | 2007-274545 A | 10/2007 |
| JP | 2010-226167 A | 10/2010 |
| JP | 2011-077808 A | 4/2011 |
| WO | WO 2011/045981 A1 | 4/2011 |
| WO | WO 2011/161929 A1 | 12/2011 |

OTHER PUBLICATIONS

Japanese Office Action dated Jul. 7, 2014 with a partial translation.

\* cited by examiner

DIVERGING DEVICE WITH OADM FUNCTION AND WAVELENGTH DIVISION MULTIPLEXING OPTICAL NETWORK SYSTEM AND METHOD THEREFOR

TECHNICAL FIELD

The present invention relates to prevention of deterioration in signal quality during a cable fault of a wavelength multiplexing optical network system.

BACKGROUND ART

As an optical network system including three or more stations according to wavelength multiplexing in wavelength multiplexing optical transmission, an optical network system using a wavelength branching apparatus (or diverging device) having optical adding/dropping functions (OADM: Optical Add Drop Multiplexer) has been proposed. Due to the OADM, a signal can be arbitrarily inserted (added) or extracted (dropped) in units of wavelength of light.

In addition, unlike a fiber branching apparatus, in the wavelength branching apparatus having the OADM, in order to perform the wavelength adding/dropping, a signal band in one optical fiber is divided for communication among three stations. In this case, there is a problem in that, if a cable fault occurs in an arbitrary branch, a quality of a signal communicating between remaining two branches is deteriorated. This problem will be described in detail. In a case where a cable fault occurs, a signal which is to be originally inserted is not multiplexed. Therefore, the number of channels of main signals is decreased. Since a power of a relay is almost constant, a decrease in number of channels of main signals leads to an increase in channel power. In addition, there is a problem in that transmission characteristic according to a nonlinear effect of a transmission line is deteriorated due to the increase in channel power.

Various techniques have proposed in order to prevent the deterioration in signal quality according to the cable fault.

For example, in a technique disclosed in PTL 1, a dummy light beam for compensating for optical level is disposed in a transmission band (for example, a band L1 in the case of communication between A and B); an interval of cable disconnection is detected from each of terminal station apparatuses A, B, and C in the entire network system; the dummy light beam which is optimized in terms of signal quality is controlled.

In a technique disclosed in PTL 2, the deterioration in signal quality is prevented by switching an uplink signal and a downlink signal by using a matrix switch during cable disconnection.

CITATION LIST

Patent Literature

{PTL 1} Japanese Patent Application Laid-Open No. 2010-226167
{PTL 2} Japanese Patent Application Laid-Open No. 10-173598

SUMMARY OF INVENTION

Technical Problem

The deterioration in signal quality can be prevented by using the above-described techniques. However, the above-described techniques have the following problems.

For example, like the technique disclosed in PTL 1, in a case where each terminal station apparatus controls a dummy light beam, there are problems as follows.

(1) Since the system is managed in the entire network, the control is complicated.

(2) In order to perform the control, there is a possibility that signal deterioration (in the worst case, communication disconnection) may occur for a certain time interval.

(3) Essentially, during cable disconnection, each signal power may not be maintained in the same state in each branch of the branching apparatus, and signal deterioration occurs.

There are the above-described problems.

In addition, in order to implement the technique disclosed in PTL 2, a matrix switch and an apparatus for controlling the matrix switch are needed. Therefore, there is a problem in that the configuration is complicated.

Accordingly, the present invention is to provide a branching apparatus which does not require controlling by a terminal station apparatus and changing of a path and has an OADM function capable of preventing deterioration in signal quality at the occurrence of a cable fault, a wavelength multiplexing optical network system, and a method therefor.

Solution to Problem

According to a first aspect of the present invention, there is provided a wavelength branching apparatus connected to three or more stations, wherein an uplink signal received from each of the stations is monitored; if a lack of the uplink signal received from any one of the stations is detected, a dummy light beam is output instead of the lacked signal; the dummy light beam and an uplink signal received from a station other than the any one of the stations are multiplexed/demultiplexed; and the multiplexed/demultiplexed signal is output, and wherein all the processes are performed in the wavelength branching apparatus.

According to a second aspect of the present invention, there is provided a wavelength multiplexing optical network system including: three or more terminal station apparatuses; a relay apparatus which is connected to the three or more terminal station apparatuses; and a wavelength branching apparatus which is connected to the three or more terminal station apparatuses through the relay apparatus, wherein the wavelength branching apparatus is the wavelength branching apparatus according to the first aspect of the present invention.

According to a third aspect of the present invention, there is provided a wavelength branching method performed by a wavelength branching apparatus connected to three or more stations, including: monitoring an uplink signal received from each of the stations; outputting a dummy light beam instead of a lacked signal if a lack of the uplink signal received from any one of the stations is detected; multiplexing/demultiplexing the dummy light beam and an uplink signal received from a station other than the any one of the stations; and outputting the multiplexed/demultiplexed signal, wherein all the processes are performed in the wavelength branching apparatus.

Advantageous Effects of the Invention

According to the present invention, a branching apparatus includes a circuit which detects disconnection of optical input power of each branch, an optical amplifier which compensates for the optical power, and the like, so that controlling by a terminal station apparatus and changing of a path are not required, and deterioration in signal quality at the occurrence of a cable fault can be prevented.

REFERENCE SINGS LIST 111, 112, 121, 122, 131, 132, 141, 142: branching coupler
211, 212, 221, 222, 231, 232, 241, 242: photodiode
311, 321, 331, 341: optical amplifier
400: control circuit
511, 521, 531, 541: optical filter
601, 602, 603, 604, 801, 802, 803, 804: multiplexing/demultiplexing coupler
711, 721, 731, 741: LD
1000, 1001, 1002: branching apparatus
2000: terminal station apparatus
3000: relay apparatus

DESCRIPTION OF EMBODIMENTS

First, embodiments of the present invention will be described in brief. In brief, the embodiment of the present invention is directed to an undersea cable system including three or more stations, where a function of compensating for an optical power level with respect to a cable fault occurring in an arbitrary branch of a branching apparatus is included inside the branching apparatus, so that deterioration in signal quality is suppressed.

Next, embodiments of the present invention will be described in detail with reference to the drawings.

Figure 1:
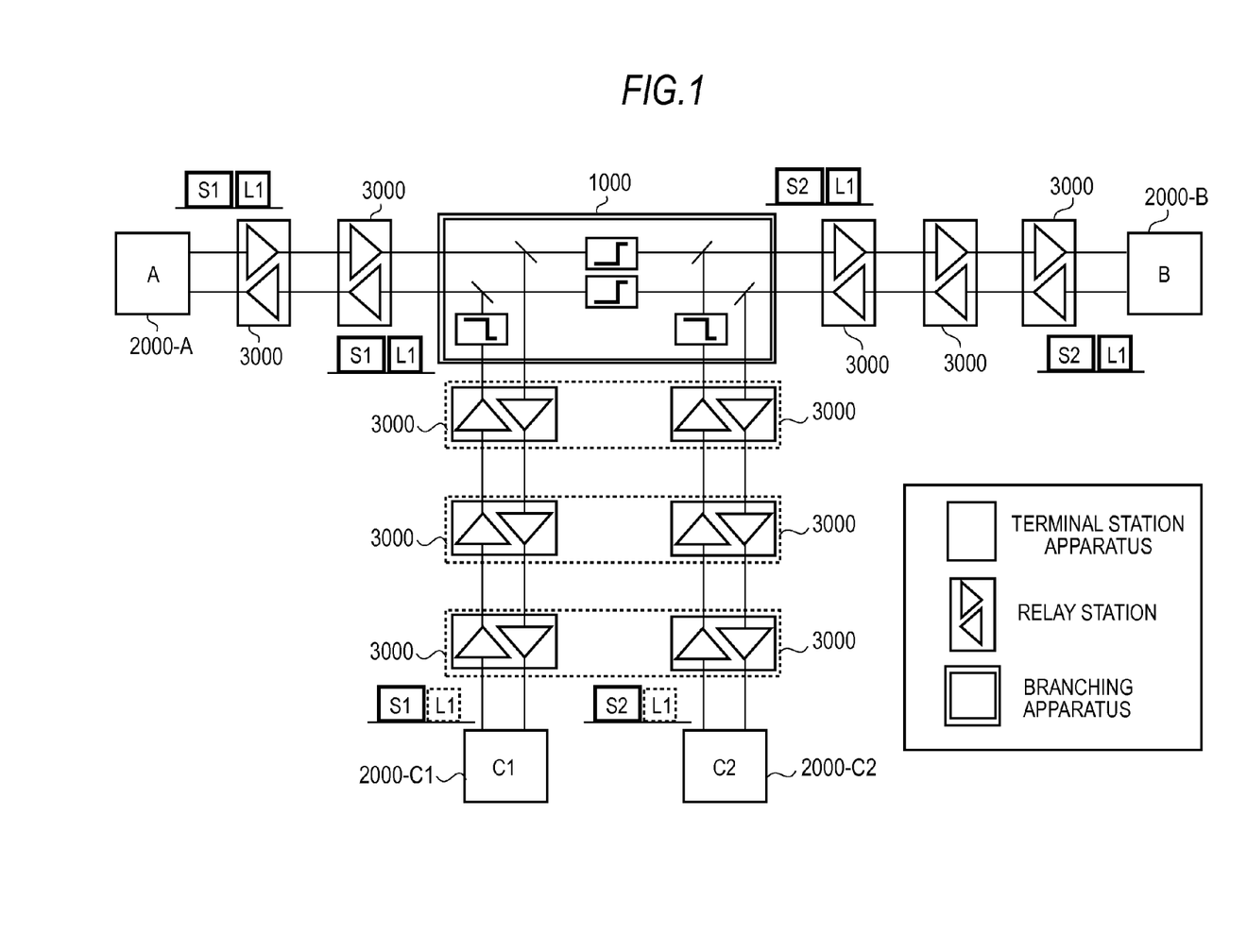
FIG. 1 A figure illustrates a basic configuration of a wavelength multiplexing optical transmission system according to an embodiment of the present invention.

FIG. 1 illustrates an overall configuration of a wavelength multiplexing optical network system including wavelength branching according to an embodiment of the present invention. Referring to FIG. 1, the wavelength multiplexing optical network system according to the embodiment is configured to include a branching apparatus 1000, a terminal station apparatus 2000-A, a terminal station apparatus 2000-B, a terminal station apparatus 2000-C1, a terminal station apparatus 2000-C2, and a plurality of relay stations 3000.

The branching apparatus 1000 is an OADM branching apparatus, which has a unique configuration according to the embodiment. For the convenience of description, the configuration of the branching apparatus 1000 is not illustrated in FIG. 1. The detailed configuration of the branching apparatus 1000 will be described later with reference to FIG. 2.

The branching apparatus 1000, the terminal station apparatus 2000-A, the terminal station apparatus 2000-B, the terminal station apparatus 2000-C1, and the terminal station apparatus 2000-C2 are terminal station apparatuses, which communicate optical signals with each other.

The relay station 3000 maintains an optical power at a constant level. The relay station 3000 outputs an optical signal of a substantially constant power irrespective of a power of an input optical signal.

Next, a communication method will be described in detail.

The terminal station apparatus 2000-A, the terminal station apparatus 2000-B, and the terminal station apparatus 2000-C are terminal station apparatuses. The terminal station apparatus 2000-A and the terminal station apparatus 2000-B communicate with each other in a wavelength band L1. The terminal station apparatus 2000-A and the terminal station apparatus 2000-C1 communicate with each other in a wavelength band S1. The terminal station apparatus 2000-B and the terminal station apparatus 2000-C2 communicate with each other in a wavelength band S2. The S1 and the S2 are the same in terms of a signal band, and signals in communication in the S1 and the S2 are different from each other.

The terminal station apparatus 2000-A transmits signals in both signal bands S1 and L1 in order to communicate with the terminal station apparatus 2000-B and the terminal station apparatus 2000-C. The signal output from the terminal station apparatus 2000-A is 2-branched by the branching apparatus 1000 to be transmitted to the terminal station apparatus 2000-B and the terminal station apparatus 2000-C1. The branching apparatus 1000 blocks the signal band S1 by a filter in the direction from the terminal station apparatus 2000-A to the terminal station apparatus 2000-B and multiplexes a signal in the signal band S2 from the terminal station apparatus 2000-C2.

Figure 2:
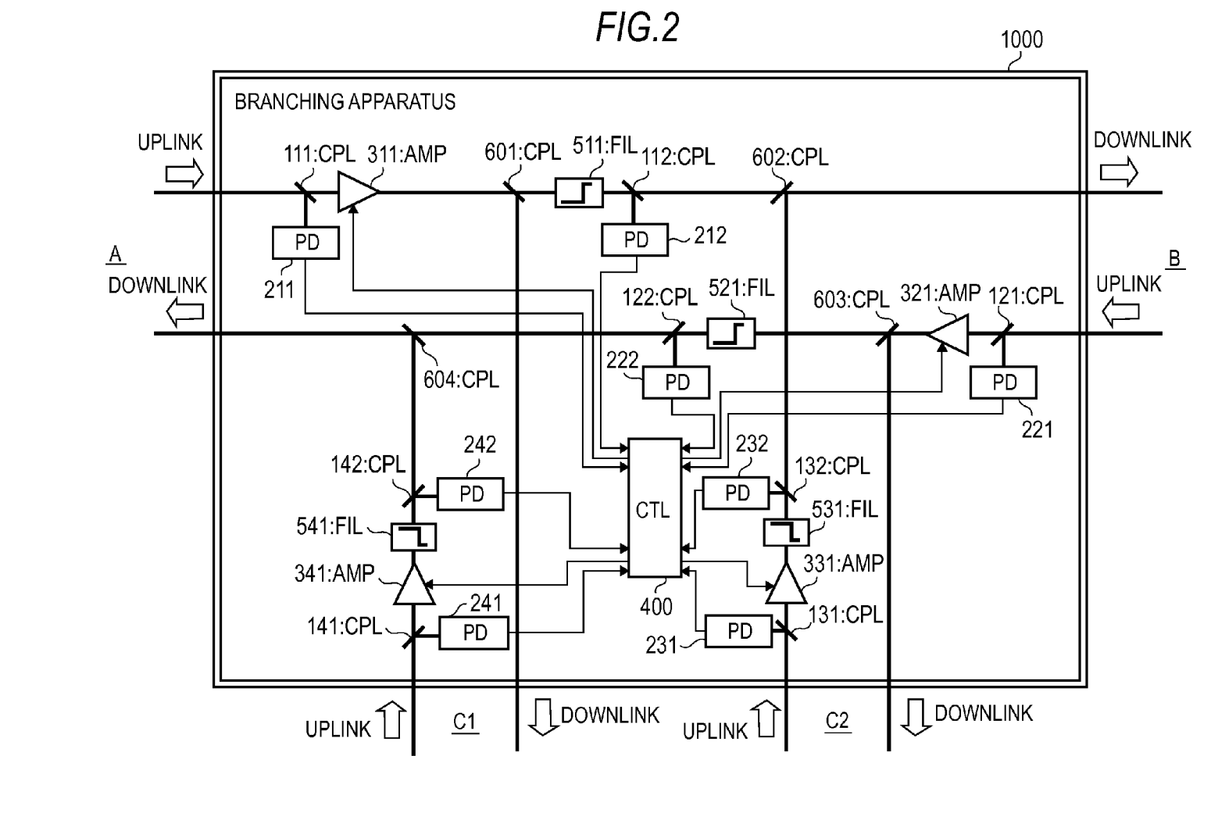
FIG. 2 A figure illustrates a basic configuration of a branching apparatus according to the embodiment of the present invention.

Next, a detailed configuration of the branching apparatus 1000 will be described with reference to FIG. 2. Referring to FIG. 2, the branching apparatus 1000 is configured to include branching couplers (in figures and description hereinafter, appropriately referred to as "CPLs") 111, 112, 121, 122, 131, 132, 141, and 142, photodiodes (in figures and description hereinafter, appropriately referred to as "PDs") 211, 212, 221, 222, 231, 232, 241, and 242, optical amplifiers (in figures and description hereinafter, appropriately referred to as "AMPS") 311, 321, 331, and 341, a control circuit (in figures and description hereinafter, appropriately referred to as a "CTL") 400, optical filters (in figures and description hereinafter, appropriately referred to as "FILs") 511, 521, 531, and 541, and multiplexing/demultiplexing couplers (in figures and description hereinafter, appropriately referred to as "CPLs") 601, 602, 603, and 604.

Each branching coupler detects an optical signal power which is incident from the uplink direction.

Each photodiode performs photo-electric conversion on the optical signal branched by the branching coupler.

Each optical amplifier can amplify an optical signal and output amplified spontaneous emission (hereinafter, referred to as an "ASE light beam") as a dummy light beam.

The control circuit 400 determines whether or not disconnection is detected from the signal which is photo-electrically converted by each photodiode and controls each optical amplifier.

Each optical filter is configured to determine adding/dropping of an optical signal band. Each multiplexing/demultiplexing coupler performs adding/dropping.

Figure 3:
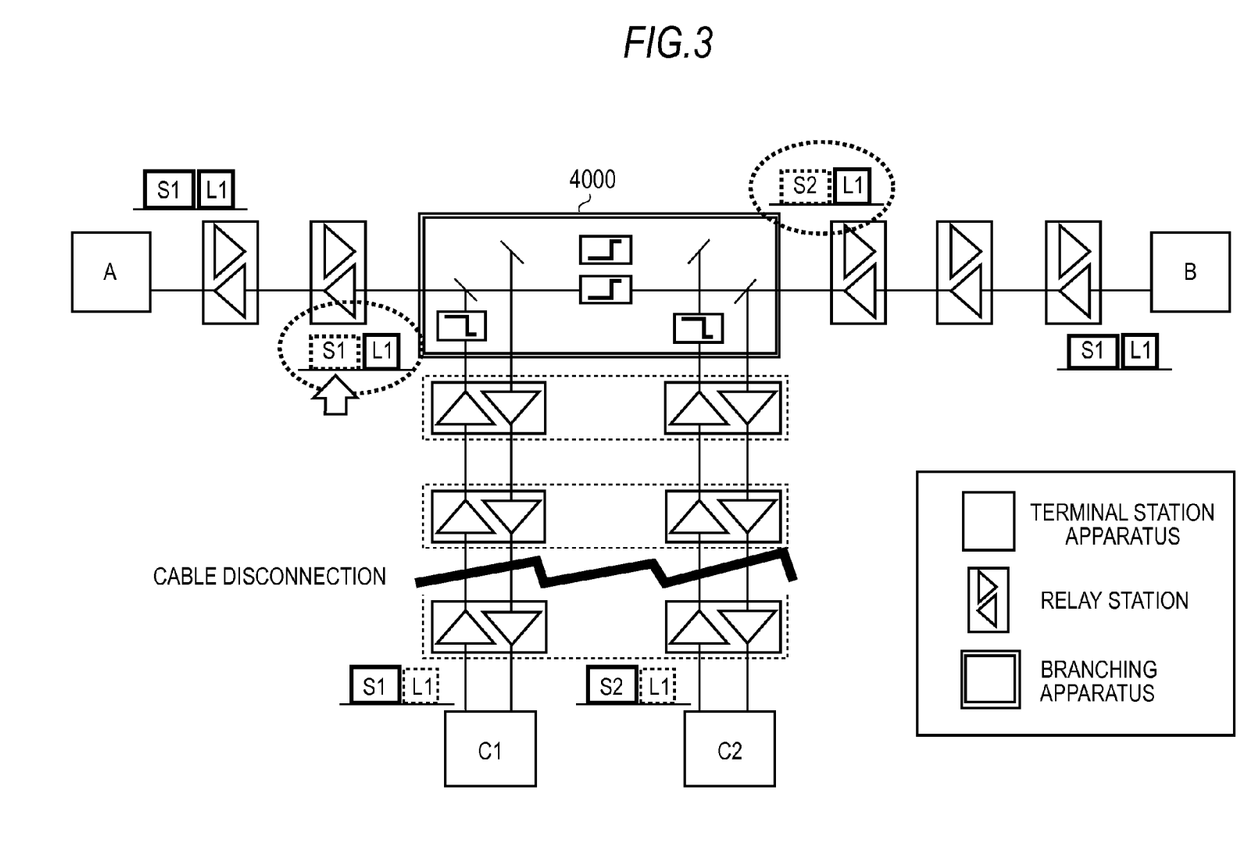
FIG. 3 A figure illustrates a situation where fault occurs in a general wavelength multiplexing optical transmission system.
Figure 4:
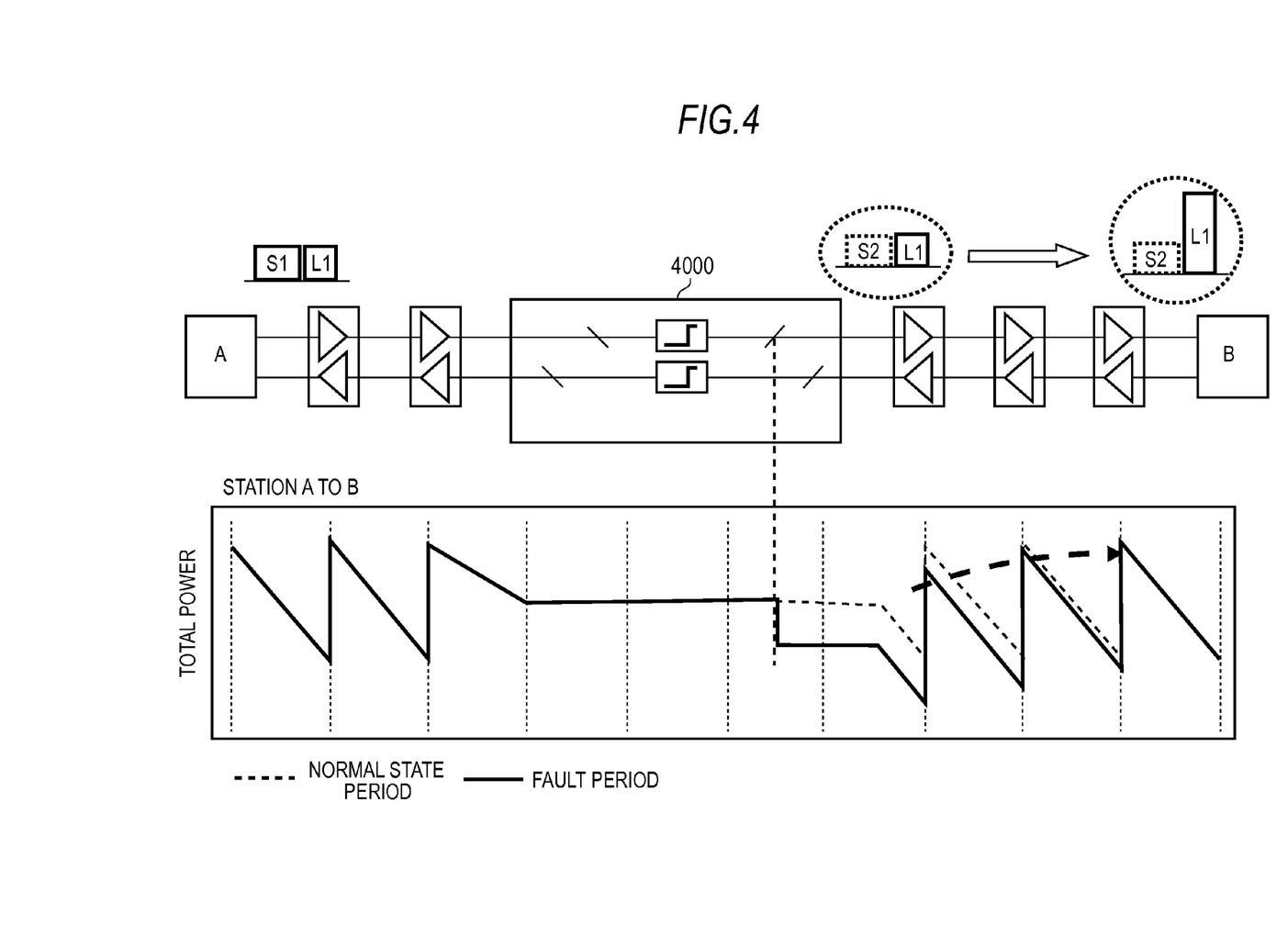
FIG. 4 A figure illustrates a behavior of an optical signal power during occurrence of fault in a general wavelength multiplexing optical transmission system.

Next, a case where a cable fault occurs will be described with reference to FIGS. 3 and 4. Although the overall configuration of the system of the example illustrated in FIGS. 3 and 4 is the same as the configuration of the embodiment, a branching apparatus 4000 illustrated in FIGS. 3 and 4 is a general branching apparatus different from the branching apparatus 1000 according to the embodiment. In other words, FIGS. 3 and 4 are diagrams illustrating problems of a general technique.

FIG. 3 illustrates a case where a cable fault occurs between a station C (C1 and C2) and a branching apparatus 4000.

In a case where the cable fault occurs, a band S2 (or band S1) is lost among the signal bands which are directed from the branching apparatus 4000 to the station B (or station A).

Due to the saturation characteristic (a characteristic where an optical power reaches a steady power by controlling excited light to be constant in a relay) of a relay 3000 between the branching apparatus 4000 and the station B (or station A), the signal power of the band L1 is increased, and the signal quality is deteriorated due to an nonlinear effect occurring in the transmission line. The deterioration in signal quality is illustrated in FIG. 4. Referring to FIG. 4, the signal quality is deteriorated during the occurrence of the fault.

Next, operations in a case where the same cable fault occurs in the embodiment illustrated in FIGS. 1 and 2 rather than a general technique illustrated in FIGS. 3 and 4 will be described.

In the embodiment, irrespective of the occurrence of a cable fault, a signal before multiplexing/demultiplexing performed by a multiplexing/demultiplexing coupler from a normal situation and a signal output from each optical filter are monitored.

More specifically, an optical signal before multiplexing/demultiplexing performed by each branching coupler and an optical signal output from each optical filter are branched. The branched optical signal is converted into an electric signal by each photodiode to be input to the control circuit 400.

The control circuit 400 detects input disconnection by monitoring the signal (signal before the multiplexing/demultiplexing by the multiplexing/demultiplexing coupler) incoming in the uplink direction, which is input from the PD 211 (or PD 221, PD 231, PD 241). Therefore, a lack of to-be-multiplexed/demultiplexed wavelength band can be detected. Namely, the control circuit 400 can detect disconnection of the optical signal incoming in the uplink direction.

In addition, if the control circuit 400 detects the lack of to-be-multiplexed/demultiplexed wavelength band actually due to actual occurrence of a cable fault, the control circuit 400 controls the AMP 311 (or AMP 321, AMP 331, AMP 341) so that the input of the PD 212 (or PD 222, PD 232, PD 242) is constant. More specifically, an ASE light beam is generated in each optical amplifier, so that the signal power outgoing in the downlink direction is compensated for. Namely, in the embodiment, the output after passing through each optical filter can be fed back.

A certain signal is taken as an example, and the embodiment and the general technique illustrated in FIGS. 3 and 4 are compared to each other.

In a case where a cable fault occurs between the branching apparatus 1000 and the terminal station apparatus 2000-C1 or the terminal station apparatus 2000-C2 as illustrated in FIG. 3, in the embodiment, the control circuit 400 recognizes based on the output of the PD 241 (or PD 231) that a cable fault occurs in the terminal station apparatus 2000-C2 (or terminal station apparatus 2000-C1) side. Next, an ASE light beam is generated by the AMP 341 (or AMP 331). In addition, the output of the PD 242 (or PD 232) is monitored, and the output is fed back, so that the AMP 341 (or AMP 331) is adjusted such that the optical power is constant. Therefore, the ASE light beam is added to the band S2 (or band S1), so that the optical signal power outgoing from the branching apparatus 1000 is constant. Accordingly, the signal quality is maintained.

Figure 5:
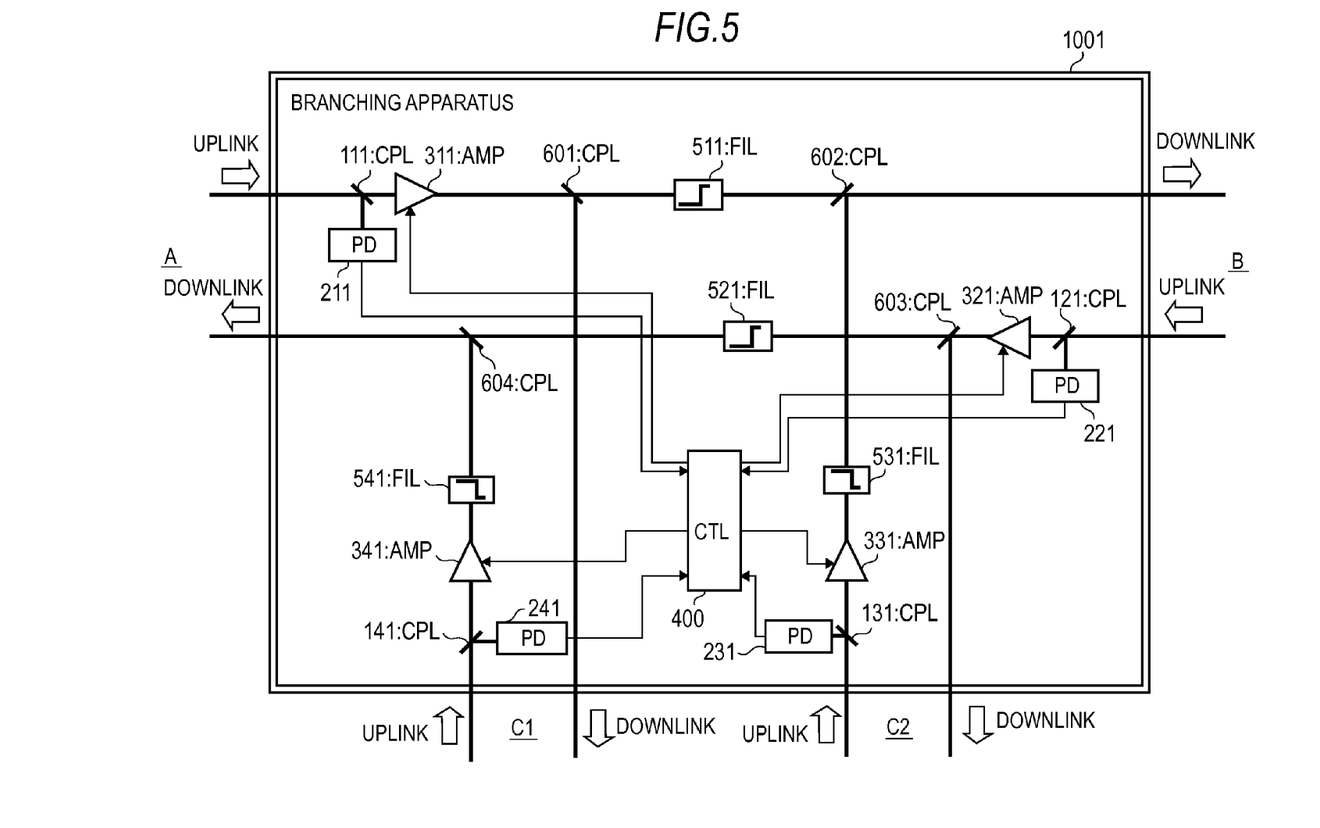
FIG. 5 A figure illustrates a basic configuration of a first modified example of the embodiment of the present invention.

Next, a first modified example of the embodiment will be described. Although an overall configuration of the first modified example is the same as that of FIG. 1, a branching apparatus 1001 configured by simplifying the configuration of the branching apparatus 1000 illustrated in FIG. 2 is used.

Referring to FIG. 5, the branching apparatus 1001 is configured to include CPLs 111, 121, 131, and 141, PDs 211, 221, 231, and 241, AMPs 311, 321, 331, and 341, a CTL 400, FILs 511, 521, 531, and 541, and CPLs 601, 602, 603, and 604.

Namely, the branching apparatus 1001 has a configuration where the branching couplers CPLs 112, 122, 132, and 142 and the photodiodes PDs 212, 222, 232, and 242 are removed from the branching apparatus 1000.

In addition, although the output after passing through each optical filter is fed back in the branching apparatus 1000, in a case where input disconnection is detected in the branching apparatus 1001, an APC (auto power control) operating point of the optical amplifier is allowed to be changed, so that the power is operated so as to be constant.

Figure 6:
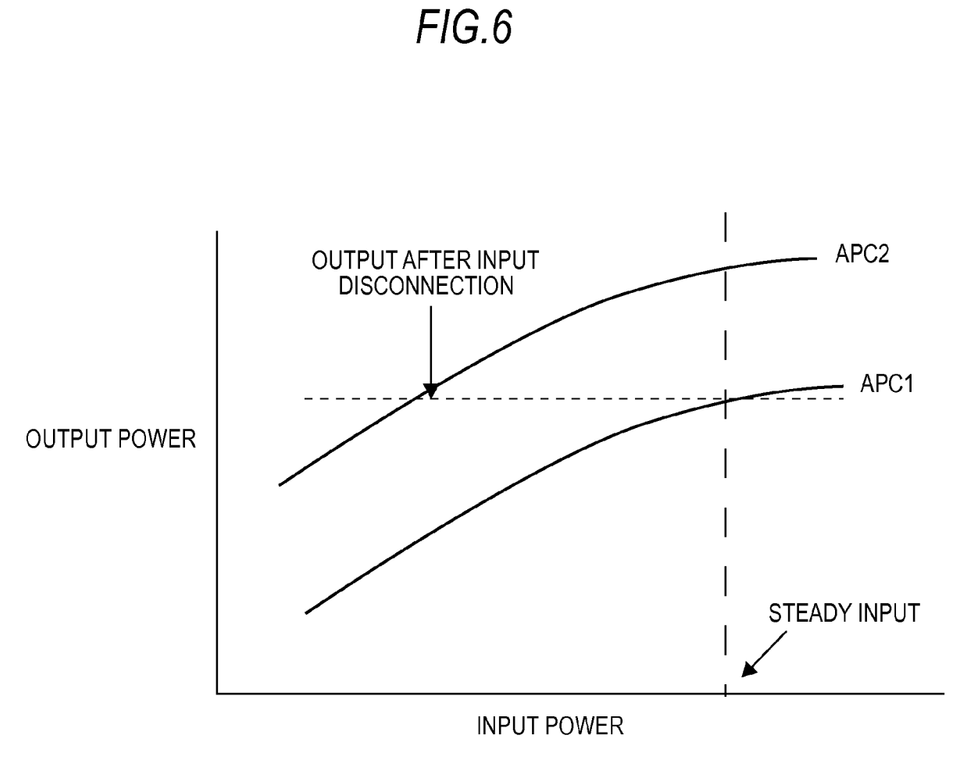
FIG. 6 A figure illustrates input/output characteristics of an optical amplifier according to the embodiment of the present invention.

This will be described with reference to FIG. 6. In general, in a case where steady input is applied, the optical amplifier is operated at an APC 1 to constitute the branching apparatus. At this time, in a case where input disconnection is detected by the PD 211 (or PD 221, PD 231, PD 241), the control circuit 400 changes the APC operating point to an APC 2 and sets an AMP 311 (or AMP 321, AMP 331, AMP 341) so that the output after the input disconnection is equal to the output in the case of the steady input. Therefore, the control circuit 400 compensates for the signal power.

Next, a second modified example of the present invention will be described.

Figure 7:
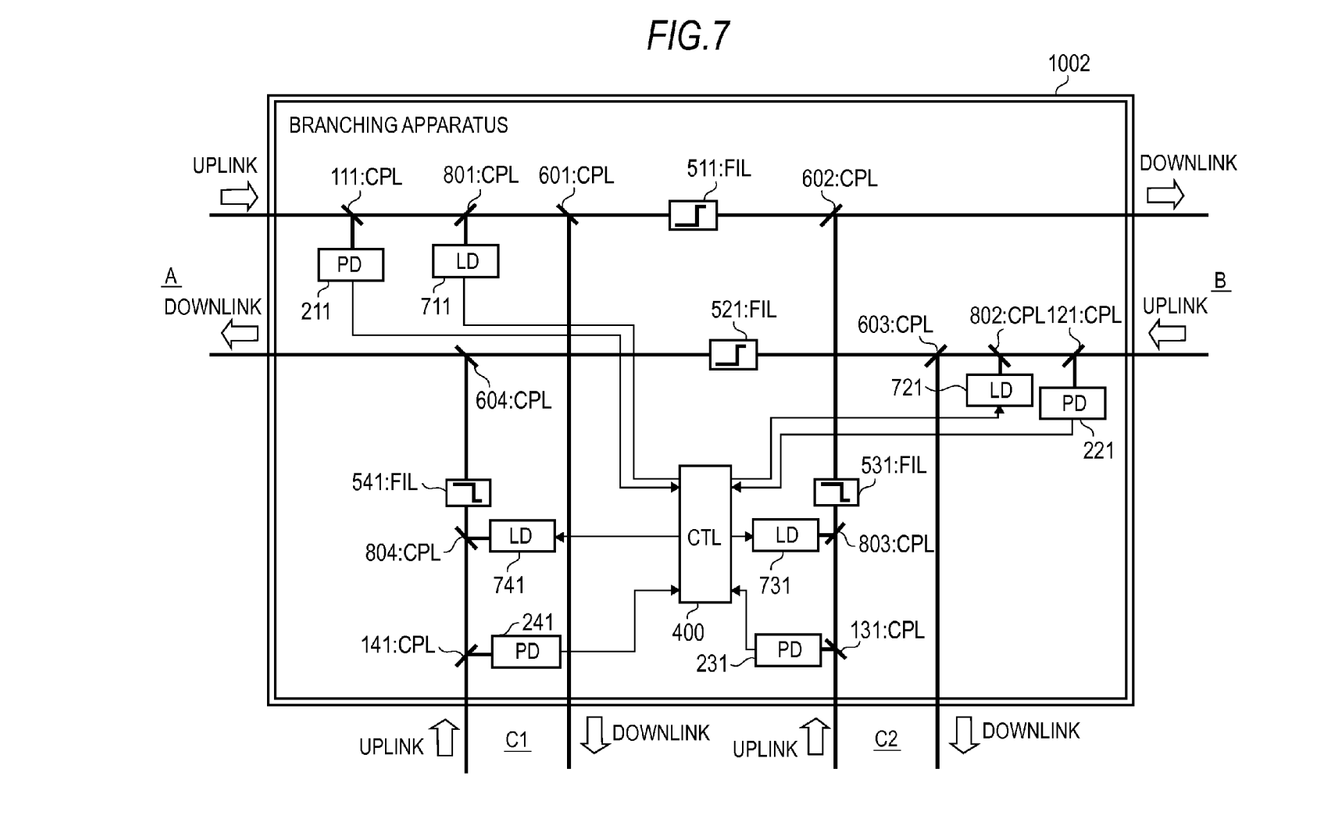
FIG. 7 A figure illustrates a basic configuration of a second modified example of the embodiment of the present invention.

The second modified example is an example where LDs (Laser diodes) are used instead of optical amplifiers. More specifically, the branching apparatus 1002 is configured to include CPLs 111, 121, 131, and 141, PDs 211, 221, 231, and 241, a CTL 400, FILs 511, 521, 531, and 541, CPLs 601, 602, 603, and 604, LDs 711, 721, 731, and 741, and CPLs 801, 802, 803, and 804.

As oscillation wavelengths of the LDs 711, 721, 731, and 741, wavelengths which are not influenced by blockage of the optical filters are appropriately selected. During the signal blocking, the LDs 711, 721, 731, and 741 are operated so that the generated light beams are inserted into the CPLs 801, 802, 803, and 804 as multiplexing/demultiplexing couplers.

In FIG. 7, the CPLs 801, 802, 803, and 804 are disposed at the front stage of the FILs 511, 521, 531, and 541. However, the CPLs 801, 802, 803, and 804 may be disposed at the rear stage of the FILs 511, 521, 531, and 541.

According to the present invention described above, a branching apparatus includes a circuit which detects disconnection of optical input power of each branch and an optical amplifier which compensates for the optical power, so that deterioration in signal quality in an OADM network can be suppressed. Therefore, it is possible to obtain an effect in that a robust OADM network system can be provided.

In addition, in the embodiment, an output of a filter (for example, FIL 511 of FIG. 1) is monitored, and an optical power of the AMP 311 is controlled, so that an optical power of which wavelength is to be added can be controlled. Namely, since the ASE of the optical amplifier has the entire wavelength bands, the optical power just after the AMP 311 (=just before the FIL 511) is monitored, so that the problem that appropriate add power may not be obtained can be solved in the embodiment.

In addition, if a dummy light beam is inserted from a terminal station, there is a problem in that an interval occurs where a total power in the optical fiber is increased according to an increase in the dummy light beam during the cable fault in an interval from the terminal station to the branching apparatus, or a defect occurs in an interval (interval from the terminal station apparatus 2000-A to the branching apparatus 1000 in FIG. 1, that is, an interval before dropping in the branching apparatus 1000). However, in the embodiment, since the dummy light beam is inserted inside the branching apparatus rather than the terminal station, it is possible to obtain an advantage in that the above-described defect does not occur.

The present invention is based on Japanese Patent Application No. 2011-094126, filed on Apr. 20, 2011, and priority under the Paris Convention is claimed to Japanese Patent Application No. 2011-094126. The entire content disclosed in Japanese Patent Application No. 2011-094126 is incorporated herein by reference.

Although representative embodiments of the present invention are described in detail, it should be noted that various changes, substitutions, and alternatives may be available without departing from the spirit of the invention and the scope of the invention defined by the claims. In addition, although the claims are amended in the course of application, the inventors intend that the equivalent range of the claimed invention should be maintained.

A portion of or all of the above-described embodiment may be disclosed as the following supplementary notes, but the prevent invention is not limited thereto.

(Supplementary note 1) A wavelength branching apparatus connected to three or more stations, wherein an uplink signal received from each of the stations is monitored; if a lack of the uplink signal received from any one of the stations is detected, a dummy light beam is output instead of the lacked signal; the dummy light beam and an uplink signal received from a station other than the any one of the stations are multiplexed/demultiplexed; and the multiplexed/demultiplexed signal is output, and wherein all the processes are performed in the wavelength branching apparatus.

(Supplementary note 2) The wavelength branching apparatus according to supplementary note 1, includes: a first branching coupler which branches the uplink signal received from each of the stations before the multiplexing/demultiplexing; and a first photodiode which converts the signal branched by the first branching coupler to an electric signal, wherein the lack of the uplink signal is detected by monitoring the electric signal converted by the first photodiode.

(Supplementary note 3) The wavelength branching apparatus according to supplementary note 1 or 2, further includes an optical amplifier which generates the dummy light beam; an optical filter which passes the dummy light beam before the multiplexing/demultiplexing; a second branching coupler which branches a signal after the passing through the optical filter; and a second photodiode which converts the signal branched by the second branching coupler to an electric signal, wherein the occurrence of the dummy light beam by the optical amplifier is controlled by monitoring the electric signal converted by the second photodiode so that input to the second photodiode is constant.

(Supplementary note 4) The wavelength branching apparatus according to supplementary note 1 or 2, further includes an optical amplifier which amplifies the uplink signal received from each of the stations before the multiplexing/demultiplexing, wherein, when the lack of the uplink signal is not detected, the optical amplifier is operated at a first APC (Auto Power Control) operating point; and when the lack of the uplink signal is detected, the optical amplifier is operated at a second APC (Auto Power Control) operating point.

(Supplementary note 5) The wavelength branching apparatus according to supplementary note 1 or 2, wherein, if the lack of the uplink signal is detected, a light beam obtained by operating an LD (laser diode) at a wavelength which is not influenced by blockage of an optical filter is output instead of the lacked signal.

(Supplementary note 6) A wavelength multiplexing optical network system, includes: three or more terminal station apparatuses; a relay apparatus which is connected to the three or more terminal station apparatuses; and a wavelength branching apparatus which is connected to the three or more terminal station apparatuses through the relay apparatus, wherein the wavelength branching apparatus is the wavelength branching apparatus according to any one of supplementary notes 1 to 5.

(Supplementary note 7) A wavelength branching method performed by a wavelength branching apparatus connected to three or more stations, including: monitoring an uplink signal received from each of the stations; outputting a dummy light beam instead of a lacked signal if a lack of the uplink signal received from any one of the stations is detected; multiplexing/demultiplexing the dummy light beam and an uplink signal received from a station other than the any one of the stations; and outputting the multiplexed/demultiplexed signal, wherein all the processes are performed in the wavelength branching apparatus.

(Supplementary note 8) The wavelength branching method according to supplementary note 7, wherein the wavelength branching apparatus further includes: a first branching coupler which branches the uplink signal received from each of the stations before the multiplexing/demultiplexing; and a first photodiode which converts the signal branched by the first branching coupler to an electric signal, wherein the lack of the uplink signal is detected by monitoring the electric signal converted by the first photodiode.

(Supplementary note 9) The wavelength branching method according to supplementary note 7 or 8, wherein the wavelength branching apparatus further includes: an optical amplifier which generates the dummy light beam; an optical filter which passes the dummy light beam before the multiplexing/demultiplexing; a second branching coupler which branches a signal after the passing through the optical filter; and a second photodiode which converts the signal branched by the second branching coupler to an electric signal, wherein the occurrence of the dummy light beam by the optical amplifier is controlled by monitoring the electric signal converted by the second photodiode so that input to the second photodiode is constant.

(Supplementary note 10) The wavelength branching method according to supplementary note 7 or 8, wherein the wavelength branching apparatus further includes an optical amplifier which amplifies the uplink signal received from each of the stations before the multiplexing/demultiplexing, wherein, when the lack of the uplink signal is not detected, the optical amplifier is operated at a first APC (Auto Power Control) operating point; and when the lack of the uplink signal is detected, the optical amplifier is operated at a second APC (Auto Power Control) operating point.

(Supplementary note 11) The wavelength branching method according to supplementary note 7 or 8, wherein, if the lack of the uplink signal is detected, a light beam obtained by operating an LD (laser diode) at a wavelength which is not influenced by blockage of an optical filter is output instead of the lacked signal.

INDUSTRIAL APPLICABILITY

The present invention is very appropriate to, for example, an undersea cable system employing an optical inserting-branching apparatus (OADM-BU (Optical Add Drop Multiplexing-Branching Unit)).

The invention claimed is:

1. A wavelength branching apparatus coupled to three or more stations, comprising:
   a first monitor configured to monitor an uplink signal received from each of the stations;
   an optical amplifier configured to, if a lack of the uplink signal received from any one of the stations is detected, output a dummy light beam on behalf of the lacked signal;
   an optical filter through which the dummy light from the optical amplifier is passed;
   a converter configured to convert the signal which is output from the optical filter into an electric signal;
   a second monitor configured to monitor the electric signal;
   a controller configured to control the dummy light from the optical amplifier on the basis of the monitoring result;
   a multiplexer configured to multiplex the dummy light beam and an uplink signal received from a station other than the any one of the stations; and
   a multiplexed signal output portion configured to output the multiplexed signal.

2. The wavelength branching apparatus according to claim 1, further comprising:
   a first branching coupler which branches the uplink signal received from one of the three or more stations before the multiplexing; and
   a first photodiode which converts the signal branched by the first branching coupler to an electric signal,
   wherein the lack of the uplink signal is detected by monitoring the electric signal converted by the first photodiode.

3. The wavelength branching apparatus according to claim 1, further comprising:
   a second branching coupler which branches a signal after the passing through the optical filter; and
   a second photodiode which converts the signal branched by the second branching coupler to an electric signal,
   wherein the occurrence of the dummy light beam by the optical amplifier is controlled by monitoring the electric signal converted by the second photodiode so that input to the second photodiode is constant.

4. The wavelength branching apparatus according to claim 1, further comprising an optical amplifier which amplifies the uplink signal received from each of the stations before the multiplexing,
   wherein, when the lack of the uplink signal is not detected, the optical amplifier is operated at a first APC (Auto Power Control) operating point; and when the lack of the uplink signal is detected, the optical amplifier is operated at a second APC (Auto Power Control) operating point.

5. The wavelength branching apparatus according to claim 1, wherein, if the lack of the uplink signal is detected, a light beam obtained by operating an LD (laser diode) at a wavelength which is not influenced by blockage of an optical filter is output as the dummy light on behalf of the lacked signal.

6. A wavelength multiplexing optical network system, comprising:
   three or more terminal station apparatuses;
   a wavelength branching apparatus which is coupled to the three or more terminal station apparatuses; and
   relay apparatuses each of which is configured to couple any one of the three or more terminal station apparatuses and the wavelength branching apparatus,
   wherein the wavelength branching apparatus is the wavelength branching apparatus according to claim 1.

7. The wavelength branching apparatus according to claim 1, further comprising:
   a second branching coupler which branches a signal after the passing through the optical filter; and
   a second photodiode which converts the signal branched by the second branching coupler to an electric signal.

8. The wavelength branching apparatus according to claim 1, wherein after passing through the optical filter, the dummy light is fed back to the optical amplifier which then outputs the dummy light.

9. The wavelength branching apparatus according to claim 1, further comprising a second optical filter through which the dummy light from the optical amplifier is passed,
   wherein after passing through the optical filter and the second optical filter, the dummy light is fed back to the optical amplifier which then outputs the dummy light.

10. A wavelength branching method performed by a wavelength branching apparatus which is coupled to three or more stations, the method comprising:
    monitoring an uplink signal received from each of the stations;
    outputting a dummy light beam on behalf of a lacked signal if a lack of the uplink signal received from any one of the stations is detected at an optical amplifier;
    passing the dummy light from the optical amplifier through an optical filter;
    converting the signal which is output from the optical filter into an electric signal;
    monitoring the electric signal;
    controlling the dummy light from the optical amplifier on the basis of the monitoring result;
    multiplexing the dummy light beam and an uplink signal received from a station other than the any one of the stations; and
    outputting the multiplexed signal.

11. The wavelength branching method according to claim 10, wherein the wavelength branching apparatus further includes:
    a first branching coupler which branches the uplink signal received from one of the three or more stations before the multiplexing; and
    a first photodiode which converts the signal branched by the first branching coupler to an electric signal, and
    wherein the lack of the uplink signal is detected by monitoring the electric signal converted by the first photodiode.

12. The wavelength branching method according to claim 10, wherein the wavelength branching apparatus further includes:
    an optical amplifier which generates the dummy light beam;
    an optical filter which passes the dummy light beam from the optical amplifier;
    a second branching coupler which branches a signal after the passing through the optical filter; and
    a second photodiode which converts the signal branched by the second branching coupler to an electric signal, wherein the occurrence of the dummy light beam by the optical amplifier is controlled by monitoring the electric signal converted by the second photodiode so that input to the second photodiode is constant.

13. The wavelength branching method according to claim 10, wherein the wavelength branching apparatus further includes an optical amplifier which amplifies the uplink signal received from each of the stations before the multiplexing, wherein, when the lack of the uplink signal is not detected, the optical amplifier is operated at a first APC (Auto Power Control) operating point; and when the lack of the uplink signal is detected, the optical amplifier is operated at a second APC (Auto Power Control) operating point.

14. The wavelength branching method according to claim 10, wherein, if the lack of the uplink signal is detected, a light beam obtained by operating an LD (laser diode) at a wavelength which is not influenced by blockage of an optical filter is output as the dummy light on behalf of the lacked signal.

15. The wavelength branching method according to claim 10, wherein the wavelength branching apparatus further includes:

an optical amplifier which generates the dummy light beam;

a second branching coupler which branches a signal from the optical amplifier; and a second photodiode which converts the signal branched by the second branching coupler to an electric signal, wherein the occurrence of the dummy light beam by the optical amplifier is controlled by monitoring the electric signal converted by the second photodiode so that input to the second photodiode is constant.

16. The wavelength branching method according to claim 10, further comprising, after passing through the optical filter, feeding back the dummy light to the optical amplifier which then outputs the dummy light.

17. The wavelength branching method according to claim 10, further comprising passing the dummy light from the optical amplifier through a second optical filter; and after passing through the optical filter and the second optical filter, feeding back the dummy light to the optical amplifier which then outputs the dummy light.

* * * * *